Nov. 19, 1963 E. H. GATZERT ET AL 3,111,661

ANALOG-TO-DIGITAL CONVERTER

Filed Oct. 29, 1958

INVENTOR.
ERNEST H. GATZERT
GERALD R. PAUL
BY
ATTORNEY 3,111,661

ANALOG-TO-DIGITAL CONVERTER

Ernest H. Gatzert and Gerald R. Paul, Rochester, N.Y., assignors to General Dynamics Corporation, Rochester, N.Y., a corporation of Delaware Filed Oct. 29, 1958, Ser. No. 770,340
4 Claims. (Cl. 340—347)

Figure 1:
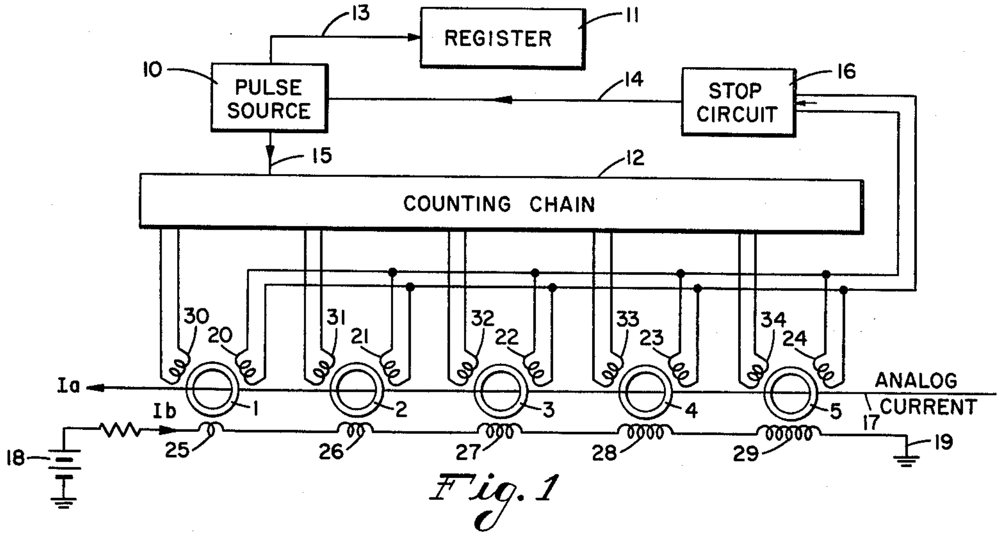

This invention relates to data processing equipment and more particularly to analog-to-digital converters.

Modern day electronic equipment stores data which may be used to perform many functions. Typically, the data may be fed into such electronic equipment either as "digital" information or as "analog" information. The word "digital" usually means information that appears in terms of discrete increments as numerical or alphabetical values or codes. The term "analog" usually means information in some other form, such as a continuously variable current which may be expressed as a curve or graph, for example.

Very often, electronic data processing equipment must convert from one form of data to the other. For example, a complex mechanical movement may be sensed by a charge built upon a capacitor with a movable plate, such charge varying according to the distance between the plates to provide an analog signal. It may be desirable to convert such analog signal to a digital code which may be reproduced, as by a teletypewriter, for example, to inform interested persons as to the location of the movable mechanical member.

In the past, such analog-to-digital converters have been extremely expensive, a typical converter requiring a complex of sampling circuits designed to narrow limits repeatedly until a fixed value is assigned to the analog current.

An object of this invention is to provide a new and improved analog-to-digital converter.

Another object of this invention is to provide an inexpensive analog-to-digital converter.

Briefly, the foregoing objects are accomplished by a plurality of bi-stable elements, each being normally in a first of its stable conditions. To each of the elements there is applied a biasing signal which tends to urge the elements toward the second of their stable conditions, such bias being applied in increments so that each succeeding element is biased a little more toward or away from its second stable state than preceding or succeeding elements, as the case may be. An analog signal may be applied to the bi-stable elements in a manner that supplements the biasing signal whereupon certain of the elements are triggered to their second stable condition and other of the elements remain in their first stable condition. One of the elements is now in a critical state wherein it remain in its first condition but is biased very nearly to the critical point where it will be triggered to its second condition. Any suitable means may be provided for scanning each of the elements in turn. When the critically biased element is found, it is triggered to its second condition. Means responsive to the triggering of the critically biased element is provided for giving a digital indication which corresponds to the value of the analog current.

Further objects and advantages of the invention will become apparent as the following description proceeds and the features of novelty which characterize the invention will be pointed out with particularity in the claims annexed to and forming part of this specification.

Figures 2, 3:
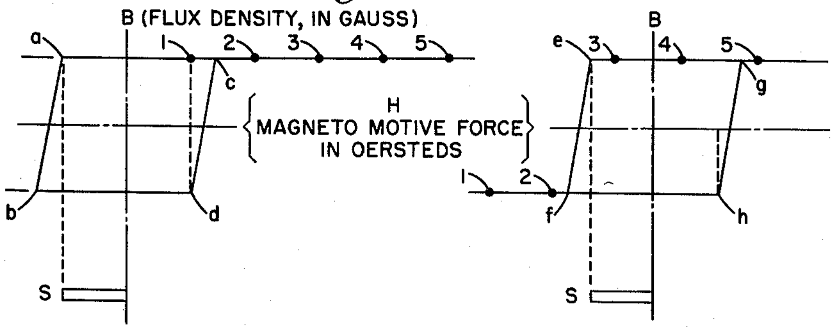
Figure 4:
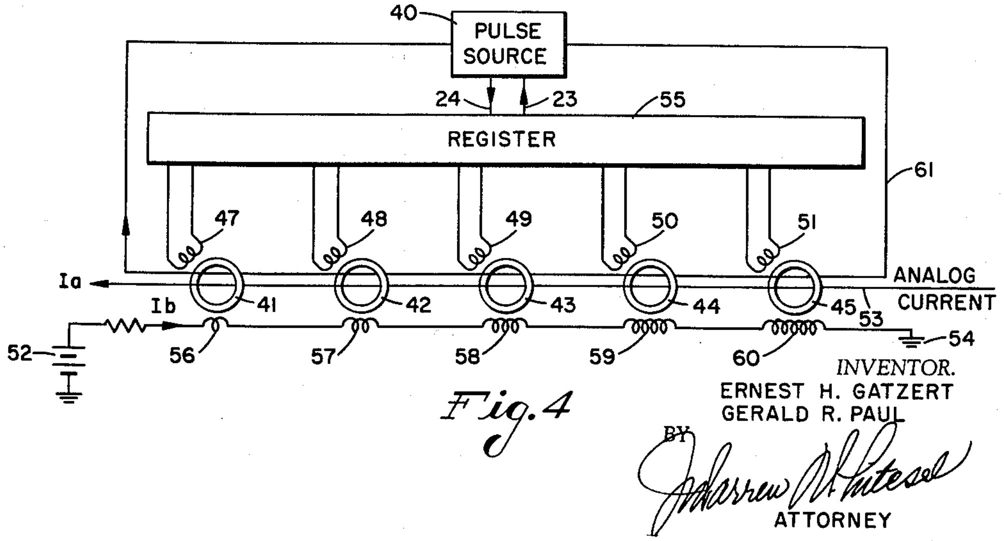

For a better understanding of the invention, reference may be made to the accompanying drawings in which:

FIG. 1 shows a first embodiment of the invention;

FIG. 2, a hysteresis loop, shows the magnetic state of the various core members in a quiescent stage without the application of an analog current;

FIG. 3, also a hysteresis loop, illustrates the manner in which the magnetic state of various cores may be changed by the application of an analog current; and FIG. 4 shows a second embodiment of the invention.

FIGS. 1 and 4 show two embodiments of an analog-to-digital converter made in accordance with the subject invention. A plurality of bi-stable elements such as gas tubes, transistors, relays, or the like may be provided; however, for purposes of description only, the drawing shows the bi-stable elements as magnetic cores 1–5 and 41–45 which are adapted to change from one direction of saturation to the other direction of saturation responsive to electrical currents traversing windings associated therewith. Associated with each of the cores are various windings 20, 25, 30 etc. which are adapted to create magnetic flux within the core. It is recognized that the design may vary—sometimes requiring bucking magnetic flux and sometimes requiring aiding magnetic flux; therefore, the windings have not been shown with any preferred direction of turning. However, as will be explained below, arrows have been used to indicate biasing current $I_b$ and analog current $I_a$ that produce opposite effects.

The hysteresis loops of FIGS. 2 and 3 are graphic representations of the magnetic state of the various cores as current is applied to the windings. For example, cores 1–5 are normally in a state of positive saturation as shown in FIG. 2. Current in windings 25 and 30 may drive core 1 in the direction of knee "*a*" at which time the core is triggered to negative saturation at knee "*b*." As current is reduced in windings 25 and 30, core 1 remains in negative saturation until knee "*d*" is reached at which time core 1 is triggered to its first or positive saturated state at knee "*c*". The remaining cores 2–5 and 41–45 function in a similar manner.

Scanning means is provided in the form of counting chain 12 (FIG. 1) which may be any suitable device such as a chain of electronic tubes, transistors, relays, or the like, wherein each pulse from a source 10, such as a multivibrator, turns "on" a primed circuit in chain 12 which in turn turns "off" a preceding circuit in chain 12 and primes a succeeding circuit in chain 12. As each circuit is turned "on" in sequence, a pulse from source 10 is applied to a winding on a corresponding core. For example, the first effective pulse that is received from pulse 10 turns "on" a circuit in counting chain 12 and applies a pulse "S" to winding 30. The second effective pulse from source 10 turns "off" the circuit which was effective for energizing winding 30 and turns "on" a circuit which applies a pulse to winding 31. Succeeding pulses energize windings 32, 33 and 34 in turn.

Register 11 is any suitable means for counting pulses as they are generated by pulse source 10. As explained below, the triggering of a critically biased core causes stop circuit 16 to transmit a stop signal to pulse source 10, thereby stopping the registration of further pulses in register 11.

*Circuit Operation*

Means is provided in the form of series connected windings 25–29 and 56–60 for biasing bi-stable elements 1–5 and 41–45 respectively to positive saturation. The bias is increased incrementally for each succeeding core so that an increased amount of magnetomotive force in the negative direction is required to trigger each succeeding core to negative saturation. For example, referring to FIG. 1, core 1 has a biasing winding 25 of a single turn, core 2 has a biasing winding 26 of two turns, and core 3 has a biasing winding 27 of three turns, etc.

An analog current $I_a$ may be applied via conductor 17 to oppose the bias current $I_b$, thereby driving certain ones of the bi-stable elements into the second of the two conditions depending upon the magnitude of the analog current. For example, it may be assumed that the analog current produces a flux which, when algebraically added to the flux derived from biasing windings such as 25 and 26, will trigger cores 1 and 2 to the negative saturation state, to bias core 3 to a critical stage near knee "*e*", as shown in FIG. 3, and will leave cores 4 and 5 in a non-critical positive saturation condition.

When an analog signal $I_a$ is applied to conductor 17, the magnetic flux produced in each of the cores may either aid or buck the flux produced by the biasing winding. The basic principle is the same in either case; however, for purposes of explanation only, the analog current is shown by an arrow indicating that the magnetic flux resulting therefrom tends to overpower the flux resulting from current in the biasing windings.

Sampling means, comprising pulse source 10, is connected via conductor 15 and chain 12 to apply driving currents or pulses to bias the bi-stable elements 1–5 sequentially further toward their negatively saturated condition. Driving pulses applied to cores 1 and 2, when in the state indicated by FIG. 3, do nothing except further saturate the cores in the negative direction and thus have no practical effect. The magnitude of the driving current (or stated otherwise, of pulse "S", FIGS. 2 and 3) is such that bi-stable element 3 is triggered to the second or negative saturated state at which time a "stop" signal is induced in winding 22.

Means is provided for deriving a digital signal responsive to the triggering of critical element 3 from its positive saturated to its negative saturated conditions. For example, register 11 counts three pulses from source 10 before element 3 is triggered to generate a signal in stop circuit 16 to stop further operation of pulse source 10.

A similar operation results in FIG. 4 except that all cores are pulsed simultaneously over conductor 61 and register 55 sequentially connects windings 47–51 on cores 41–45 to control registration of a digital signal. When the critical core is effectively connected to register 55, a "stop" signal is induced as in winding 49, for example, and pulsing is stopped via conductor 23 whereupon a digital signal is stored in register 55.

Hence, it is seen that a digital signal is provided which corresponds to the magnitude of the analog current $I_a$.

Although only five bi-stable elements have been shown in FIGS. 1 and 4, it should be understood that an infinite number of similar elements may be provided depending upon the degree of accuracy that may be required. If five bi-stable elements are provided, the total distance over which the analog current may move is recorded as one of five discrete steps only. If twenty bi-stable elements are provided for the same analog variance, the analog current may be recorded in any of twenty discrete steps. Thus, it is seen that a greater degree of accuracy is had with a greater number of elements.

While specific embodiments of the invention have been shown, still further modifications may readily occur to those skilled in the art. Therefore, the invention is not to be limited to the specific arrangement shown and described, but the appended claims are intended to cover all modifications which fall within the scope and spirit of the invention.

What is claimed is:

1. An analog-to-digital converter comprising a chain of devices each having first and second conditions of operation, means for biasing successive ones of said devices to said first condition of operation by increasing amounts so that increasing values of the analog current to be measured are required to operate successive ones of said devices to their second condition of operation, means including said last named means for utilizing said analog current to be measured to operate certain of said devices to said second condition of operation while the remainder of said devices remain in said first condition of operation depending upon the magnitude of the analog current to be measured, means for successively applying a pulse to each of said devices, said pulse being of the proper polarity to operate said devices to said second condition of operation and said pulse being of such magnitude that only the device immediately succeeding the last device of said certain devices is driven to said second operated condition, and means responsive to the operation of any one of said devices to said second operated condition when said pulse is applied thereto for registering the identity of that device to thereby assign a digital value to the analog signal being measured.

2. An analog-to-digital converter comprising a chain of devices each having first and second conditions of operation, means for biasing successive ones of said devices in said first condition of operation by increasing amounts so that increasing values of the analog current to be measured are required to operate successive ones of said devices to their second condition of operation, means including said last named means for utilizing said analog current to be measured to operate certain of said devices to said second condition of operation while the remainder of said devices remain in said first condition of operation depending upon the magnitude of the analog current to be measured, a source of pulses, scanning means for applying successive pulses from said source of pulses to said devices in succession starting with the first device of said chain of devices, said pulses being of proper polarity to tend to operate said devices to said second condition of operation, and means responsive to the operation of the first one of said devices to its second condition of operation when said pulse is applied thereto for terminating the operation of said scanning means.

3. An analog-to-digital converter comprising a chain of magnetic cores each having first and second directions of saturation, first, second, third, and fourth windings on each of said cores, the first winding on each core except the first core in said chain having more turns than the first winding on the preceding core in said chain, means for connecting said first windings in series, means for producing a biasing current in said series connected first windings of sufficient magnitude to bias the first one of the cores of said chain to saturation in said first direction, means including said second windings for utilizing the analog current to be measured to produce an equal amount of flux in each of said cores which is opposite in direction to the flux produced by the first winding on that core whereby certain of said cores are saturated in said second direction while the remainder of said cores remain saturated in said first direction depending upon the magnitude of the analog current to be measured, means for applying a pulse to the third winding on each of said cores, the third winding on each of said cores being so poled that the flux produced in that core responsive to said pulse is in the same direction as the flux produced by the analog current to be measured, and said pulse being of such magnitude that only the core immediately succeeding the last core of said certain cores is driven to saturation in said second direction, whereby an output pulse is produced in the fourth winding of only the core immediately succeeding the last core of said certain cores.

4. An analog-to-digital converter comprising a chain of magnetic cores each having first and second directions of saturation, first, second, third, and fourth windings on each of said cores, the first winding on each core except the first core in said chain having more turns than the first winding on the preceding core in said chain, means for connecting said first windings in series, means for producing a biasing current in said series connected first windings of sufficient magnitude to bias the first one of the cores of said chain to saturation in said first direction, means including said second windings for utilizing the analog current to be measured to produce an equal amount of flux in each of said cores which is opposite in direction to the flux produced by the first winding on that core whereby certain of said cores are saturated in said second direction while the remainder of said cores remain saturated in said first direction depending upon the magnitude of the analog current to be measured, a source of pulses, scanning means for applying successive pulses from said source of pulses to the third windings on said cores in succession starting with said first core, the third winding on each of said cores being so poled that the flux produced in that core responsive to the receipt of a pulse is in the same direction as the flux produced by the analog current to be measured, and means responsive to the production of a pulse across the fourth winding of the one of said cores which responds to the application of one of said pulses to the third winding of that core by terminating the operation of said scanning means.

References Cited in the file of this patent

UNITED STATES PATENTS

| | | |
|---|---|---|
| 2,244,257 | Maul | June 3, 1941 |
| 2,453,454 | Norwine | Nov. 9, 1948 |
| 2,556,975 | Oberman | June 12, 1951 |
| 2,570,221 | Earp | Oct. 9, 1951 |
| 2,696,347 | Lo | Dec. 7, 1954 |
| 2,715,724 | Oberman | Aug. 16, 1955 |
| 2,739,285 | Windsor | Mar. 20, 1956 |
| 2,753,545 | Lund | July 3, 1956 |
| 2,765,405 | Gamarekian | Oct. 2, 1956 |
| 2,805,408 | Hamilton | Sept. 3, 1957 |
| 2,816,169 | Pawley | Dec. 10, 1957 |
| 2,870,433 | Simpson | Jan. 20, 1959 |
| 2,962,704 | Buser | Nov. 29, 1960 |